United States Patent Office 3,038,229
Patented June 12, 1962

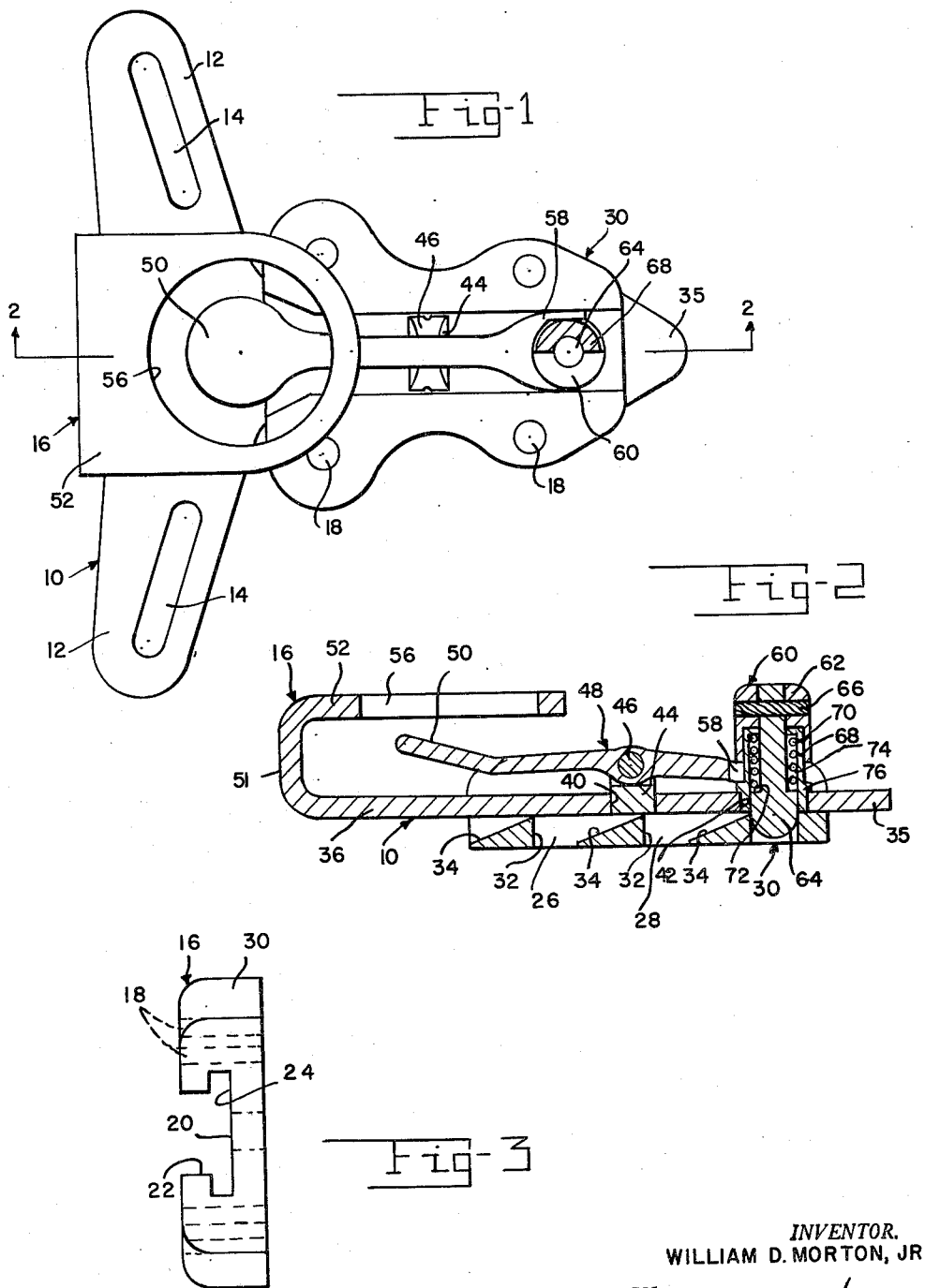

3,038,229
QUICK RELEASE MECHANISM
William D. Morton, Jr., 163 El Nido Ave.,
Pasadena, Calif.
Filed Jan. 17, 1961, Ser. No. 83,351
4 Claims. (Cl. 24—206)
(Granted under Title 35, U.S. Code (1952), sec. 266)

The invention described herein may be manufactured and used by or for the United States Government for governmental purposes without payment to me of any royalty thereon.

This invention relates to quick release mechanisms and, more particularly, to a mechanism for quickly attaching and detaching an oxygen mask from a standard hard shell helmet or other head harness.

In devices of this character, the need for a safe but foolproof method of attaching an oxygen mask to a flier's helmet or other headgear has long been felt and many attempts have been made to solve this problem. Quick release mechanisms are subject to the hazard of accidental release and the reluctance of personnel to use them because of the hazards involved.

The object of the present invention is the provision of a new type quick release mechanism for use wherever such a mechanism is needed, and specifically for attaching an oxygen mask harness to a standard hard shell helmet, or other head harness.

A further object of the invention is to provide a simply constructed sturdy quick release mechanism provided with a safety device for preventing accidental release, and one which makes available a selection of locking positions for adjustment purposes.

In the drawing, FIG. 1 is a top plan view of the device.

FIG. 2 is a vertical cross-sectional view taken on the line 2—2 of FIG. 1.

FIG. 3 is an end view of the bayonet element of the device.

Referring more in detail to the drawing, the device consists primarily of two elements, a first substantially U-shaped element 10 having wing members 12 with diagonally placed slots 14 therein, for attachment to the straps of an oxygen mask, and a second bayonet slot element 16 provided with screw or rivet holes 18 or other securing means for attaching the section 16 to a flier's helmet or other harness. The problem to which the present invention provides a solution is providing a device for easily and securely attaching these two sections together in such a manner that they can be quickly detached for removal of the mask when desired, but in such a manner also, that release will not take place accidentally.

The second section 16 is provided with a groove 20 on its upper surface, of the bayonet slot type having overhanging shoulders 22 and floor 24. The floor portion 24 of the member 16 is provided throughout its longitudinal extent with a series of openings. In the present disclosure, three openings 26, 28 and 30 are shown, but it will be understood that the invention is not limited to this number. The openings 26, 28 and 30 are all circular at their base as shown in FIG. 2. Each is provided with a vertical wall 32. Openings 26 and 28 are provided with an oppositely positioned inclined wall surface 32 which provides camming action for a plunger element later to be described. The opening 30 nearest the end 35 of the member 16 is a simple bore cut directly through the floor portion 24 and having an unbroken vertical cylindrical wall.

The member 10 is provided, as described above, with wing sections 12. A base portion 36 of the member 10 is adapted to slide within the bayonet slot 20, the rounded end 35 implementing the ease of engagement. It is provided with a pair of openings 40 and 42. A pivot block 44 is secured in to the opening 40 and carries a pivot member 46 for the latch member 48. The lever latch member 48 is pivoted and has its fulcrum at 46. The end 50 of the lever 48 provides an operating thumb press for operating the release device. The member 10 is formed with a spacing portion 51 and a spaced plate portion 52, extending reversely to form a shield over the latch portion 50 for preventing the accidental operation of the latch handle 50 by extraneous objects. An opening 56 in the plate 52 may be restricted if desired to a size to allow operation of the lever 50 by thumb operation only.

The opposite end of the lever 48 is a bifurcated element 58. A catch, or latch assembly, is indicated generally by the numeral 60. It is comprised of an upper thimble member 62 having a central axial bore therethrough for receiving a plunger element 64. The thimble and plunger are secured together in the upper portion of both by a transverse pin 66. The thimble 62 is provided with a counterbore which accommodates a sleeve element 68. The sleeve element has an inner smooth surface and a restricted upper shoulder 70 which forms, together with a shoulder element 72 on the plunger 64, spring seats and a spring recess for a compression spring 74. The sleeve 68 enters the opening 42 and is slidable therein. The bifurcated ends of the lever are impounded between the shoulder 76 on the sleeve 68 and the lower edge of the thimble member 62, forming a device for lifting the thimble and raising the plunger 64 out of engagement with the element 10.

The operation of this device will now be apparent. For attaching the mask or other element, the plate 36 guided by the rounded end 35 is inserted into the slot 20 and slid toward the right as shown in FIGS. 1 and 2. The plunger 64 will slide up an incline 34 into an adjacent opening, up the next incline and so on until it reaches the last opening 30 where it will remain until it is unlatched. If backward pressure is applied, that is, if pressure is applied to bias the elements 10 and 16 apart at any position, the plunger will slide backward until it reaches a vertical wall 32, where it will be stopped from further movement, or released altogether if the incline 34 is the last on the left. That is to say, the elements can be engaged and tightened to the last position which is the opening 30 without the use of the thumb press 50.

When it is desired to release or loosen the mask, the thumb press 50 is pressed downward, lifting the opposite end of the lever 48. The bifurcated portion 58 engaging the lower edge of the thimble 62, raises it. The shoulder 72 on the plunger 64 compresses the spring 74 and the whole latch assembly is lifted out of the opening 30. As long as the thumb press 50 is held depressed, the plunger element 64 is lifted out of and held from engagement in any opening. When the thumb press 50 is released, a plunger 64 slides down the incline 34 into the adjacent opening and remains there. The movement just described produces a loosening of the oxygen mask and finally a complete release of it.

While the invention is shown and described in connection with one form for illustrative, rather than restrictive purposes, it is obvious that changes and modifications may be made by those skilled in the art without departing from the scope and spirit of the invention as defined in the accompanying claims.

I claim:
1. A quick release mechanism for quick release of an oxygen mask comprising a substantially U-shaped first member having lateral wings for attachment to an oxygen mask, a second element having means for attachment to a helmet or other head harness, a base portion form- ing one of the legs of said U-shaped member, a lever fulcrumed at a mid portion thereof on said base portion, a thumb press on one end of said lever, a shield for said thumb press forming the other leg of said U-shaped member, said shield being provided with an opening for allowing operation of said thumb press therethrough, a bifurcation on the remaining end of said lever, said base portion being slidable in a bayonet slot in said second element and extending longitudinally thereof, there being openings in said second element located on the floor of said bayonet slot, a plunger spring biased for selective engagement in said openings, the bifurcation on said lever engaging said plunger to lift said plunger from an opening when pressure is placed on said thumb press the walls of said openings providing camming surfaces for sliding of said first and second elements with respect to each other in one direction and stops for preventing relative movement of said elements in the other direction.

2. A quick release mechanism comprising a first element and a second element, means on each element for securing each element to an article of equipment, said second element being provided with a bayonet slot, a floor for said slot having openings therein, cam surfaces and stop surfaces adjacent said openings, a spring pressed plunger mounted on said first element and adapted to enter said openings to hold said first and second elements against relative movement in one direction and allow relative movement in the other direction, a lever, fulcrumed midway of its ends, a thumb press on one end, and means on the opposite end to engage and lift said plunger out of engagement with said openings to allow movement of said first and second elements in a direction to detach said elements, and a shield on said first element and integral therewith extending over said thumb press and spaced therefrom for preventing accidental displacement of said lever and inadvertent release of said elements, having an opening in said shield for allowing access to said thumb press.

3. A quick release mechanism for attaching one article of airmen's equipment to another article of equipment, said mechanism comprising, a first element attachable to one of said articles, a second element attachable to the other of said articles, a lever fulcrumed midway its ends on said first element, said lever having a thumb press on one end thereof, a plunger also mounted on said first element and adapted to slide partially through said first element, a spring surrounding a stem on said plunger, and biasing said plunger to a downward position of protuberance through said first member, a thumb press on one end of said lever, the opposite end of said lever being provided with means for engagement with said plunger for lifting said plunger, one end of said first member being curved around and over said thumb press to provide a shield for preventing accidental operation of said lever, said shield being provided with an opening for allowing operation of said thumb press, said second element being provided with a bayonet slot, and openings in the floor thereof, said first member being adapted to slide within said bayonet slot and to accommodate the entrance of said plunger into selected ones of said openings.

4. A quick release mechanism comprising a first element and a second element, means on each element for securing said element to an article of equipment, said second element being provided with a bayonet slot, a floor for said slot having openings therein, cam surfaces and stop surfaces adjacent said openings, a plunger mounted on said first element for selective engagement in said openings, a lever fulcrumed on said first element at an area between the ends thereof, a bifurcation on one end of said lever, a thimble, a stem on said plunger entering said thimble and secured at its upper end to the closed end of said thimble, a hollow sleeve mounted in said thimble and positioned to surround said stem in spaced relation thereto to provide a spring seat and a spring recess, a compression spring positioned in said spring recess and seated between said sleeve and a shoulder on said plunger, said bifurcated end on said lever adapted to engage said thimble to raise said plunger against the bias of said compression spring, a thumb press on the opposite end of said lever, a shield on said first member extending above and in spaced relation to said thumb press, said shield positioned to guard the device against accidental operation of said thumb press, said shield being provided with an opening for allowing access of an operator to said thumb press to lift said plunger out of an opening to allow release or adjustment of said device.

References Cited in the file of this patent

UNITED STATES PATENTS

| 707,497 | Bennet | Aug. 19, 1902 |
| 1,026,817 | McCrone | May 21, 1912 |
| 1,117,416 | McKelvy | Nov. 17, 1914 |
| 1,369,064 | Toyama | Feb. 22, 1921 |
| 2,876,028 | Shoup | Mar. 3, 1959 |
| 2,967,342 | Henry | Jan. 10, 1961 |

FOREIGN PATENTS

| 215,025 | Australia | Sept. 13, 1956 |
| 1,176,141 | France | Apr. 7, 1959 |